UNITED STATES PATENT OFFICE.

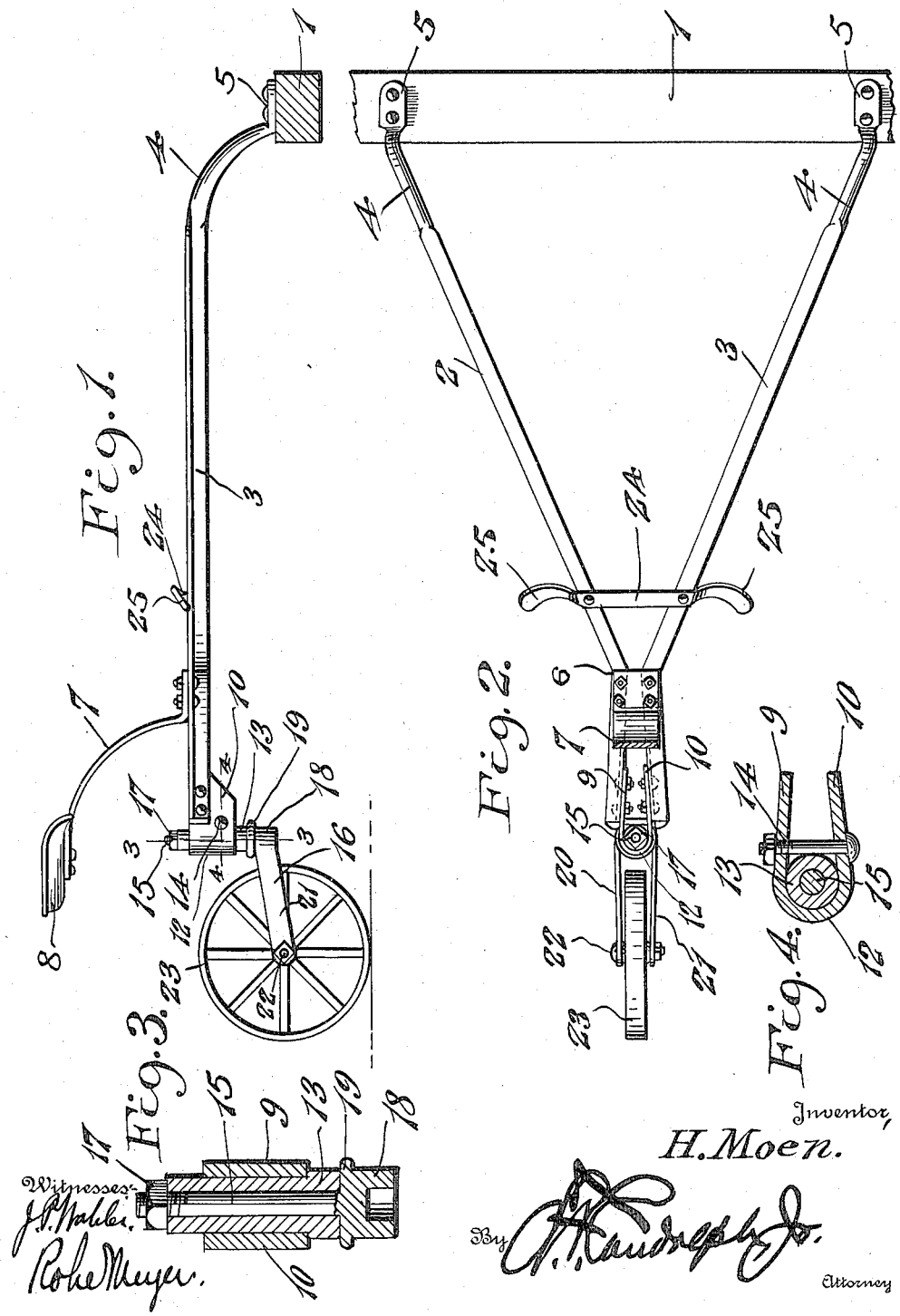

HARDY MOEN, OF NEW EFFINGTON, SOUTH DAKOTA.

DRAG-CART.

1,152,200. Specification of Letters Patent. Patented Aug. 31, 1915.

Application filed February 6, 1915. Serial No. 6,515.

*To all whom it may concern:*

Be it known that I, HARDY MOEN, a citizen of the United States, residing at New Effington, in the county of Roberts and State of South Dakota, have invented certain new and useful Improvements in Drag-Carts; and I do hereby declare the following to be a full, clear, and exact description of the invention, such as will enable others skilled in the art to which it appertains to make and use the same.

This invention relates to drag carts, and the primary object of the invention is to provide a one wheel cart for attachment to drags, harrows or like agricultural implement, by means of which the driver may ride rearwardly of the drag or harrow.

Another object of this invention is to provide a cart as specified, which is extremely simple in construction, and may be readily attached to or detached from any type of agricultural implement of the drag nature.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved drag cart, Fig. 2 is a top plan view of the cart, Fig. 3 is a vertical section on the line 3—3 of Fig. 1, and Fig. 4 is a cross section on the line 4—4 of Fig. 1.

Referring more particularly to the drawings, 1 designates the attaching bar of the drag cart, which is adapted for attachment to any suitable type of agricultural implement of the drag nature, such as a harrow or the like. The bar 1 has secured thereto in spaced relation to each other, arms 2 and 3. The arms 2 and 3 are constructed of angle iron and have their forward ends curved downwardly and bent horizontally, as is clearly shown at 4 and 5 in Fig. 2 of the drawings. The horizontal bent terminals of the bars 2 and 3 are securely attached to the upper surface of the bar 1 in any suitable manner. The bars 2 and 3 converge as they extend rearwardly, to a point intermediate of their ends, as is indicated at 6 in Fig. 2 of the drawings. The bars 2 and 3 diverge as they extend rearwardly from the point 6. The bars 2 and 3 have secured to their upper surfaces, directly in the rear of the terminals of the converged portion, a spring standard 7, which has a seat 8 of the ordinary construction secured to its upper end.

The rear ends of the bars 2 and 3 are spaced from each other and they have secured to their inner surface, the legs 9 and 10 of a U-shaped clevis 12. The vertex of the clevis 12 extends rearwardly of the ends of the bars 2 and 3, and has a sleeve or bushing 13 mounted therein, and held in place by a bolt 14 which extends through the legs 9 and 10 of the clevis and clamps them in firm binding engagement with the circumference of the sleeve 13. The sleeve 13 has the spindle 15 of an axle supporting yoke or fork 16 rotatably mounted therein, and held against vertical movement, by means of a nut 17 which is mounted upon its upper end above the upper end of the sleeve 13. The lower end of the spindle 15 is enlarged, as is shown at 18, and it has an annular flange 19 formed thereupon, against the upper surface of which the lower end of the sleeve 13 rests. The enlarged end 18 of the spindle 15 has rearwardly extending arms 20 and 21 of the axle fork secured thereto. The arms 20 and 21 have an axle 22 rotatably carried by their rear ends, upon which axle is rotatably mounted a traction wheel 23.

A bar 24 is secured to the bars 2 and 3, forwardly of the point 6, and it has its outer end curved, as is shown at 25, for forming foot receiving sockets, providing a rest for the feet of the operator.

In the use of the improved drag cart, the bar 1 is secured to the drag or other agricultural implement in any suitable manner, and the person driving the team which is hitched to the agricultural implement, rides upon the seat 8, which positions the weight of the person rearwardly and removed from the drag or other agricultural implement.

In reducing the invention to practice certain minor features of construction, combination and arrangement of parts may necessitate alteration, to which the patentee is entitled, provided such alterations are comprehended within the scope of what is claimed.

What is claimed is:—

1. In a drag cart, a pair of bars converging from their ends to a point intermediate of their ends, an attaching bar secured to the forward ends of said bars, a spring standard secured to the upper surface of said bars directly in the rear of said point of convergence, a seat carried by the upper end of said standard, a substantially U-shaped clevis, the legs of said clevis being secured to the rear ends of said bars, a sleeve carried by said clevis, an axle supporting yoke having a spindle formed thereupon and extending vertically therefrom, said spindle being rotatably mounted within said sleeve, means for holding said spindle against vertical displacement within said sleeve, and a traction wheel rotatably carried by said yoke rearwardly of said clevis and said sleeve.

2. In a drag cart, a pair of bars converging from their ends to a point intermediate of their ends, an attaching bar secured to the forward ends of said bars, a spring standard secured to the upper surface of said bars directly in the rear of said point of convergence, a seat carried by the upper end of said standard, a substantially U-shaped clevis, the legs of said clevis being secured to the rear ends of said bars, a sleeve carried by said clevis, an axle supporting yoke having a spindle formed thereupon and extending vertically therefrom, said spindle being rotatably mounted within said sleeve, means for holding said spindle against vertical displacement within said sleeve, a traction wheel rotatably carried by said yoke rearwardly of said clevis and said sleeve, a bar secured to the upper surfaces of said converging bars and having its outer ends extending outwardly from said bars and curved for forming foot receiving sockets.

In testimony whereof I affix my signature in presence of two witnesses.

HARDY MOEN.

Witnesses:
C. G. PEDERSON,
J. H. MOEN.

Copies of this patent may be obtained for five cents each, by addressing the "Commissioner of Patents, Washington, D. C."